3,579,559
PREPARING MUCONONITRILE FROM BENZENE
Manfred Otto Unger, Wilmington, Del., assignor to E. I. du Pont de Nemours and Company, Wilmington, Del.
No Drawing. Filed May 29, 1968, Ser. No. 732,873
Int. Cl. C07c 121/02
U.S. Cl. 260—465.3
4 Claims

ABSTRACT OF THE DISCLOSURE

Vapor phase reaction of benzene with ammonia and oxygen at above 300° C. to produce mucononitrile.

BACKGROUND OF THE INVENTION

Mucononitrile has been produced in the past by the dehydrohalogenation of a 3,4-dihaloadiponitrile. Such a technique is described in U.S. Pat. No. 2,564,102 issued Aug. 14, 1951 to Frank S. Fawcett et al.

A series of Japanese Pats. 11,802–11,815/67 published July 5, 1967, describe the production of saturated aliphatic nitriles by the amminoxidation of cyclohexane using a variety of catalysts derived from molybdenum.

SUMMARY OF THE INVENTION

The present invention involves the production of a mixture of cis-cis, cis-trans, and trans-trans 1,4-dicyanobutadiene hereinafter referred to as mucononitrile by reacting benzene with ammonia and oxygen.

The reaction is carried out in the vapor phase at temperatures in excess of 300° C. Generally, temperatures of 600° C. should not be exceeded. The preferred range of temperatures is from 400 to 580° C.

The reaction is generally carried out at from 0.1 to 5 atm. pressure. The preferred range is from 0.9 to 1.2 atm.

The reaction preferably is carried out in a continuous reactor in which the three reactants are passed through the reactor with an average contact time under reaction conditions of about 0.1 to 20 seconds. When using this contact time without a catalyst a low conversion (benzene converted to nitriles) is obtained. When a good catalyst is used, conversions of above 2 percent are obtained.

Of the nitriles produced generally over about 80 percent is mucononitrile and when operating under the preferred conditions over 90 percent is mucononitrile.

The ammonia should be fed to the reactor at a 2 to 4 times greater rate (molar ratio) than the benzene is fed.

The oxygen should be fed to the reactor at a 2 to 10 times greater rate (molar ratio) than the benzene is fed.

If desired, an inert gas such as nitrogen, carbon dioxide, or steam may be fed to the reactor, generally at a rate equal to 1 to 50 moles per mole of benzene fed. When using some catalysts it is advantageous to add steam to the gas stream.

While the reaction can be performed in the absence of a catalyst the use of a catalyst increases the reaction rate as well as the percentage of mucononitrile in the nitriles produced. Thus, it is preferred that a catalyst be present in the reactor. The catalysts generally are modified molybdenum oxide, or vanadium oxide, or mixtures thereof, and are used in the form of a granular packing or bed through which or over which the gaseous reaction medium is passed. If desired, the catalyst may be used as a fluidized bed. Generally, the catalyst can be prepared by refluxing an aqueous mixture of a molybdenum salt, any of phosphoric acid, arsenic acid, or boric acid and a salt such as a nitrate of any of titanium, bismith, cadmium, antimony, chromium, cobalt, zinc, lead, copper, barium, aluminum, magnesium or tungsten for 10–20 hours after which the mixture is dried by heating at 110–150° C. and activated by heating at 400 to 600° C. for 3–20 hours. The resulting catalyst is then sieved into various mesh sizes and used. Generally, a 10 to 20 mesh size (U.S. standard) is preferred. A particularly preferred catalyst is prepared by modifying boron phosphate with a smaller amount of a molybdenum salt such as ammonium molybdate and a vanadate such as ammonium vanadate according to the technique set forth above.

Mucononitrile as produced by the present invention is readily hydrogenated by methods known in the art to form adiponitrile. Adiponitrile, in turn, is a commonly used intermediate in the production of hexamethylene diamine used in the production of polyhexamethylene adipamide, a well known nylon used as a molding resin, and to produce textile fibers.

DESCRIPTION OF THE PREFERRED EMBODIMENTS

Example I

A Mo-Bi-p catalyst is made as follows: 0.48 g. 85% $H_3PO_4$ and 8.25 g. of $MoO_3$ are mixed with water to form a paste. To this mixture is then added 13.7 g. $HNO_3$ and 17.9 g. $Bi(NO_3)_3 \cdot 5H_2O$. To this slurry 300 g. of boron phosphate are added. The mixture is then dried at 120° C. and activated for 16 hours at 550° C. The resulting catalyst is sieved into 10–20, 20–40, and 40–100 mesh (U.S. standard).

Ten cc. of the above catalyst, 10–20 mesh, is placed in a Vycor tube having an ID of 1.4 cm. and 10 cm. long. A thermocouple well, OD 4 mm., allows recording the temperature at various catalyst heights. The catalyst is heated to 450° C. and, 70 cc./min. $NH_3$, 120 cc./min. $O_2$, and 200 cc./min. $N_2$ are mixed and passed over the catalyst. An $O_2$ analyzer in the inlet and exit tube allows following the $O_2$ concentration of the gases. Benzene is metered in with a syringe using a Sage constant feed syringe drive at a rate of 0.12 cc./min. benzene, which corresponds to 30 cc./min. gaseous benzene under standard conditions. The contact time expressed as $$\frac{\text{catalyst volume (cc.)}}{\text{gas rate [cc.(STP)/sec.]}}$$

is 1.4 seconds. The resulting product is trapped in a Dry Ice trap. It is extracted with chloroform. Gas chromatographic analysis shows that 80% (distribution percent) of the high boiling products are cis-cis, cis-trans, and trans-trans-1,4-dicyanobutadiene (mucononitrile). About 18% is maleic anhydride. About 80–85% of the benzene is recovered.

Example II

Catalyst: 44 g. ammonium molybdate in 100 cc. $H_2O$ is mixed with 58 g. $Co(NO_3)_2 \cdot 6H_2O$. 200 g. silicon carbide (Norton, 100 B) is added and the $H_2O$ evaporated. The catalyst is activated at 500° C.

Ten cc. of the above catalyst, 10–20 mesh, is charged in a reactor tube as explained in Example I. Thirty cc/min. benzene (measured as gas under standard conditions), 130 cc./min. $NH_3$, 70 cc./min. $O_2$, 200 cc./min. $N_2$ are mixed and passed over the catalyst which is heated to 450° C. the contact time is 1.4 seconds. The resulting product gives greater than 95 distr. percent mucononitriles and only traces of maleic anhydride.

Example III 43.7 g. ammonium-molybdate in 100 g. $H_2O$ is added to 58.2 g. $CO(NO_3)_2 \cdot 6H_2O$ in 100 g. $H_2O$. 150 g. Alundum (Norton, 10–16 mesh) is added and the $H_2O$ is evaporated on a steam bath. The resulting material is activated at 570° C.

Thirty cc./min. benzene (measured as gas under standard conditions), 60 cc./min. NH$_3$, 60 cc./min. O$_2$, and 250 cc./min. N$_2$ are passed over 10 cc. of above catalyst at 450° C., in the reactor tube as explained in Example I. The contact time is 1.5 seconds. The resulting product consists of about 75% mucononitrile and greater than 20% maleic anhydride.

Example IV

Fifteen g. V$_2$O$_5$ is dissolved in aqueous ammonia and then 5 g. H$_3$PO$_4$ is added. The solution is added to 50 g. Al$_2$O$_3$ (Norton, 10–20 mesh), dried on a steam bath and activated overnight at 500° C.

Ten cc. of the above catalyst is charged into a Vycor reactor and heated to 450° C. Thirty cc./min. benzene (measured as a gas under standard conditions), 70 cc./min. NH$_3$, 70 cc./min. O$_2$, and 200 cc./min. N$_2$ are passed over the catalyst. The only products detected are 70% mucononitrile and 30% maleic anhydride. The mucononitrile consists of 91% of the cis-cis isomer, 8% cis-trans, and 1% trans-trans mucononitrile.

Example V

Using the catalyst described in Example IV, 15 cc. of liquid benzene is passed as a vapor at a rate of 0.24 cc./min. (liquid measure) over 10 cc. of the catalyst together with 110 cc./min. NH$_3$, 90 cc./min. O$_2$, and 425 cc/min. N$_2$. The reactor is heated to 450° C. The resulting product is extracted with chloroform. Analysis shows 11.6% maleic anhydride, 10% of a maleonitrile, 25% cis-cis, 34.4% cis-trans, and 18.5% trans-trans mucononitrile.

Example VI

The reactor is filled with 10 cc. 10–20 mesh, of a Bi-Mo-P catalyst, described in more detail in Example I. The reactor is heated to 450° C. Eighty cc./min. NH$_3$, 60 cc./min. O$_2$, 0.068 cc./min. liquid benzene (fed as a vapor) and 450 cc./min. N$_2$ are mixed and passed over the catalyst. The resulting product is extracted with chloroform and analyzed by gas chromatography. The high boiling fraction consists of 99% mucononitrile. No maleic anhydride or maleimide is observed.

Example VII

The reactor is filled with 10 cc. of 40 mesh silicon-carbide (Norton). Seventy cc./min. NH$_3$, 100 cc./min. O$_2$, and 200 cc./min. N$_2$ are passed into the reactor together with 0.12 cc. liquid benzene/min., fed as a vapor. The resulting product is worked up as before by extracting with chloroform. Gas chromatographic analysis shows that mucononitrile has been produced. This indicates that the amminoxidation may even proceed without a catalyst by simply reacting the gases over a heat transfer medium. However, the reaction is greatly accelerated by the presence of oxidation catalysts.

Example VIII

A catalyst is prepared by dry mixing 1.17 g. of NH$_4$VO$_3$ with 20 g. of BPO$_4$. About 5 cc. of water is added to this mixture to obtain a viscous slurry, to which is added 0.528 g. of (NH$_4$)$_6$Mo$_7$O$_{24}$·4H$_2$O dissolved in 2 cc. of hot water. The resulting mixture is dried at 100° C. for 5 hours and activated at 500° C. for 15 hours, and sieved to 10–20 U.S. Standard mesh size.

A Vycor reactor with a 1.4 cm. inside diameter and 10 cm. length is filled with 10 cc. of the catalyst. The reactor is heated to 400° C. Benzene is vaporized in a preheater set at 130° C. The following materials are passed through a preheater containing quartz chips maintained at 400° C. at the following rates: N$_2$ at 200 cc. per minute; NH$_3$ at 50 cc. per minute; O$_2$ at 50 cc. per minute; and benzene as delivered to the preheater at a rate of 0.12 cc. of liquid benzene per minute. The heated mixture is then passed directly into the reactor until 15 cc. of benzene measured as a liquid are passed through the reactor. The gas mixture, emerging from the reactor, is passed through two Dry Ice traps. The exothermic reaction causes the temperature in the reactor to rise to 450° C. Nine cc. of benzene are recovered from the reactor and 6 cc. are converted for a conversion of 40%. The contents of the Dry Ice traps are extracted with chloroform and are found to contain 1.2 g. of mucononitrile for a 17% yield based on benzene converted. The main side products are maleic anhydride, fumaronitrile, and maleonitrile.

I claim:

1. A process for the production of mucononitrile which comprises contacting benzene with ammonia and oxygen in a reactor at a temperature of from 300–600° C. and under a pressure of from 0.1 to 5 atmospheres in the presence of a catalyst consisting essentially of a modified oxide of a metal of the class consisting of molybdenum and vanadium; the catalyst being prepared by reacting in an aqueous mixture a salt of a metal of the class consisting of molybdenum and vanadium, an acid selected from the group consisting of phosphoric acid, arsenic acid and boric acid, and a salt of a metal of the class consisting of titanium, bismuth, cadmium, antimony, chromium, cobalt, zinc, lead, copper, barium, aluminum, magnesium and tungsten, drying the mixture, and activating said dried mixture by heating the benzene, ammonia and oxygen being fed continuously through the reactor at a contact time of 0.1 to 20 seconds, wherein on a molar basis the ammonia is fed at a rate of 2 to 4 times the benzene feed rate and the oxygen is fed at a rate of from 2 to 10 times the benzene feed rate, and recovering mucononitrile.

2. The process of claim 1 wherein the benzene, ammonia and oxygen are contacted at a pressure of from 0.9 to 1.2 atmospheres.

3. The process of claim 1 wherein the temperature is held in the range of 400–580° C.

4. The process of claim 1 wherein the mucononitrile constitutes at least 80 mole percent of the nitriles produced.

References Cited

UNITED STATES PATENTS 3,395,159   7/1968   Levine _____ 260—465X

JOSEPH P. BRUST, Primary Examiner

U.S. Cl. X.R.

252—432,437; 260—346.8, 465.8